United States Patent [19]

Kotera et al.

[11] Patent Number: 5,283,398
[45] Date of Patent: Feb. 1, 1994

[54] RESONATOR TYPE SILENCER

[75] Inventors: Hirokazu Kotera; Shiro Ohki, both of Tokyo, Japan

[73] Assignee: Tsuchiya Mfg. Co., Ltd., Tokyo, Japan

[21] Appl. No.: 925,332

[22] Filed: Aug. 6, 1992

Related U.S. Application Data

[63] Continuation of Ser. No. 632,702, Dec. 24, 1990, abandoned.

[30] Foreign Application Priority Data

Dec. 26, 1989 [JP] Japan ............................. 1-150140[U]

[51] Int. Cl.$^5$ ............................................. E04F 17/04
[52] U.S. Cl. ..................................... 181/224; 181/226; 181/241; 181/250
[58] Field of Search ............... 181/224, 226, 229, 240, 181/241, 250, 266, 273, 277, 278

[56] References Cited

U.S. PATENT DOCUMENTS

| | | | |
|---|---|---|---|
| 2,818,132 | 12/1957 | Speck | 181/241 |
| 3,073,413 | 1/1963 | Speck | 181/224 |
| 3,121,469 | 2/1964 | Schelf | 181/224 |
| 3,750,839 | 8/1973 | McNabney | 181/241 |

FOREIGN PATENT DOCUMENTS 61-74611 5/1986 Japan.
1-1662260 11/1989 Japan.

*Primary Examiner*—Michael L. Gellner
*Assistant Examiner*—Khanh Dang
*Attorney, Agent, or Firm*—Lowe, Price, LeBlanc & Becker

[57] ABSTRACT

A resonator type silencer in which the resonance frequency is variable in accordance with engine speed of an automotive engine. The silencer is comprised of a casing connected through a neck section to a duct through which intake air or exhaust gas flows. A cylindrical rotatable member is disposed in the casing and rotatably supported on a rotatable shaft, forming an annular space between it and the inner peripheral surface of the casing. A stationary partition wall is fixedly disposed inside the cylindrical rotatable member and extends radially. A movable partition wall is disposed in the casing and extends from the rotatable shaft to the cylindrical rotatable member. The movable partition wall defines, in cooperation with the stationary partition wall, a tuning chamber inside the cylindrical movable member. A movable blocking wall is disposed in the casing to block the annular space thereby to define a peripheral passage in communication with the neck section. A part of the cylindrical rotatable member is cut out to form a communication with the peripheral passage. The cylindrical rotatable member is driven to rotate in accordance with engine speed, thereby changing the length of the peripheral passage communicating with the neck section and the volume of the tuning chamber to alter the resonance frequency of the silencer.

9 Claims, 2 Drawing Sheets

RESONATOR TYPE SILENCER

This application is a continuation of application Ser. No. 07/632,702 filed Dec. 24, 1990, now abandoned.

BACKGROUND OF THE INVENTION

1. Field of the Invention

This invention relates to improvements in a resonator type silencer whose resonance frequency is variable to attenuate noise generated in an engine throughout a wide range of engine operating conditions, and more particularly to the resonator type silencer in which at least the volume of a tuning chamber is changeable by rotationally moving a control mechanism.

2. Description of the Prior Art

A variety of resonator type silencers have been proposed for installation in the intake system or the exhaust system of an automotive internal combustion engine. Such silencers are usually arranged to attenuate noise which is generated by the engine at a predetermined frequency under a resonance effect. The silencers have problems in that they cannot deal with intake or exhaust system noise whose frequency varies throughout a wide engine operating range, for example, high to low engine speed conditions.

In view of this, it has also been proposed to change the dimensions of a resonator section of the silencer in relation to the resonance frequency, for example, the volume of the tuning chamber of the resonator. However, changing the dimensions is usually accomplished by linearly moving a control mechanism, requiring a complicated driving device for the mechanism. This renders the silencer large-sized, while requiring a large space in the intake or exhaust system.

SUMMARY OF THE INVENTION

It is an object of the present invention to provide an improved resonator type silencer whose resonance frequency is variable, which is compact and does not require a large space therefor, facilitating layout of the intake or exhaust system of an internal combustion engine.

Another object of the present invention is to provide an improved resonator type silencer whose resonance frequency is variable, in which the dimensions of a resonator section in connection with the resonance frequency are changeable by rotationally moving a control mechanism.

A first aspect of the resonator type silencer of the present invention is for an internal combustion engine and comprises a hollow neck section in communication with a duct in which gas in connection with combustion in the engine flows. A generally annular casing is fixedly connected to the neck section. An axial shaft is disposed at a central portion of the casing. A stationary partition wall is fixed to the casing and extends between the neck section and the axial shaft. A movable partition wall is disposed within the casing and radially between the axial shaft and an inner peripheral surface of the casing. The movable partition wall defines, in cooperation with the stationary partition wall, a tuning chamber in communication with the neck section. Additionally, a device is provided to rotate the movable partition wall around the axial shaft in accordance with an engine operating condition so as to change a volume of the tuning chamber.

A second aspect of the present invention resides in the resonator type silencer which is for an internal combustion engine and comprises a hollow neck section in communication with a duct in which gas in connection with combustion in the engine flows. A generally annular casing is fixedly connected to the neck section. A generally cylindrical rotatable member is disposed within and located generally coaxial with the casing to form an annular space between it and an inner peripheral surface of the casing. The cylindrical rotatable member is rotatable around an axial shaft disposed at a central portion of the casing. A stationary partition wall is disposed in the casing and inside the cylindrical rotatable member. The cylindrical rotatable member is fixed to the casing and extends radially. A movable partition wall is disposed in the casing and extends from said axial shaft to the cylindrical movable member. The movable partition wall is movable with said cylindrical movable member and defines, in cooperation with the stationary partition wall, a tuning chamber inside the cylindrical movable member. A movable blocking wall is disposed in the casing to block the annular space to define a peripheral passage in communication with the neck section. The movable blocking wall extends from the cylindrical movable member to the inner peripheral surface of the casing and movable with the cylindrical movable member. A communicating opening is formed in the cylindrical rotatable member so that the tuning chamber is communicated through the communicating opening with the peripheral passage. Additionally, a device is provided to rotate the cylindrical rotatable member in accordance with an engine operating condition.

In general, the frequency of noise generated by the engine and in an air intake duct or an exhaust pipe varies throughout a wide range during vehicle cruising. Accordingly, the cylindrical rotatable member of the silencer of the present invention is rotated at a predetermined rotational angle thereby to change the length of a neck (including the neck section and the peripheral passage) and the volume of the tuning chamber. For example, under a high engine speed operating condition, the cylindrical rotatable member rotates in a direction to increase the length of the neck and the volume of the tuning chamber, thereby causing the natural frequency due to the volume of the neck and the tuning chamber to coincide with the frequency of the engine generating noise at that time so as to give rise to resonance. Thus, the silencer is constructed and arranged to change the dimensions of a resonator section in accordance with the engine operating condition, thereby dealing with a wide range of the engine generating noise. Additionally, the dimensions of the resonator section do not change linearly but change within a certain narrow space, and accordingly a large space is not required therefor.

DETAILED DESCRIPTION OF THE INVENTION

Figure 1:
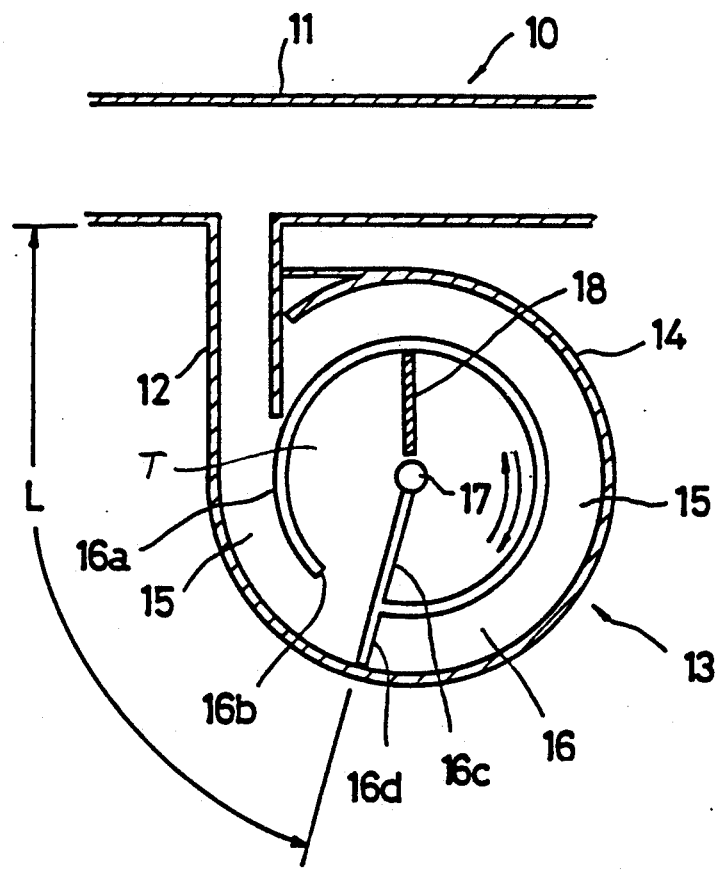
FIG. 1 is a vertical cross-sectional view of an embodiment of a resonator type silencer according to the present invention.

To facilitate the understanding of the present invention, a brief reference will be made to conventional resonator type silencers for an internal combustion engines. The conventional resonator type silencers are arranged to attenuate noise which generated by the engine at a predetermined frequency under a resonance effect. Examples of such resonator type silencers are a so-called side branched type silencer which is branched off from an air intake duct, a Helmholtz resonator type silencer in which a resonance vessel is connected through a neck section with an air intake duct, and a so-called coaxial type silencer in which a resonance cylinder is disposed coaxial with and communicated through a communicating opening with an air intake duct. The resonant frequency fr in the above three resonator type silencers is represented by the following equations:

(a) In case of the side branched type silencer:

$$fr = \frac{C}{4l}$$

(b) In case of the Helmholtz resonator type silencer:

$$fr = \frac{C}{2\pi} \sqrt{\frac{S}{Vl}}$$

(c) In case of the coaxial type silencer:

$$fr = \frac{C}{2\pi} \sqrt{\frac{nS}{Vl}}$$

wherein C is sonic speed; l is the length of a neck section; and S is the inner cross-sectional area of the neck section or communicating opening.

However, since such conventional resonator type silencers are designed to deal with noise at the predetermined frequency, it is well known that they cannot deal with intake system noise whose frequency varies throughout a wide engine operating range of from low to high engine speed conditions. Accordingly, it is a recent trend that the frequency of noise to be attenuated by the resonator type silencers is changed in accordance with the varying frequency of noise. In order to realize such a resonator type silencer, it has been proposed to make movable a part of walls of the resonance vessel thereby to change the internal volume of the resonance vessel, in which the resonant frequency is changed. Additionally, it has also been proposed that a resonance vessel is provided with a bellows whose volume is varied thereby to change the resonant frequency.

A typical example of the resonator type silencers will be discussed in detail. A resonance vessel is combustion engine and arranged to be changed in internal volume in accordance with engine speed, thereby attenuating engine generating noise whose frequency changes in accordance with engine speed under a resonance effect. More specifically, the resonance vessel is connected with the air intake duct through a neck section which is a communicating pipe or a communicating hole. In case of the communicating pipe, its length or inner diameter is varied. In case of the communicating hole, its inner cross-sectional area is varied. In the resonator type silencer of such a construction, the resonance frequency $f_o$ is represented in general by the following equation:

$$f_o = a \sqrt{Sl/V}$$

where V is the internal volume of the resonance vessel; S is the inner cross-sectional area of the communicating pipe or the communicating hole; l is the length of the communicating pipe or the communicating hole; and a is a constant.

As apparent from the above equation, the resonance frequency $f_o$ can be varied by altering the internal volume V of the resonance vessel, the length l and/or the inner cross-sectional area S of the communicating pipe or hole.

However, drawbacks have been encountered in the above discussed resonator type silencers in which the frequency of noise to be attenuated changes. That is to say, in case that a control mechanism is linearly moved to change the internal volume of the resonance vessel or the length of the neck section, a large space is required to allow the linear movement of the control mechanism while avoiding interference with other mechanisms located therearound. Additionally, the control mechanism requires a driving device for linearly driving it and therefore is complicated in structure. In this regard, the same problems have been encountered in the silencer in which the inner cross-sectional area or opening degree of the neck section is varied by means of a butterfly valve. It will be understood that the case of changing the internal volume of the resonance vessel becomes the highest in production cost.

Figure 2:
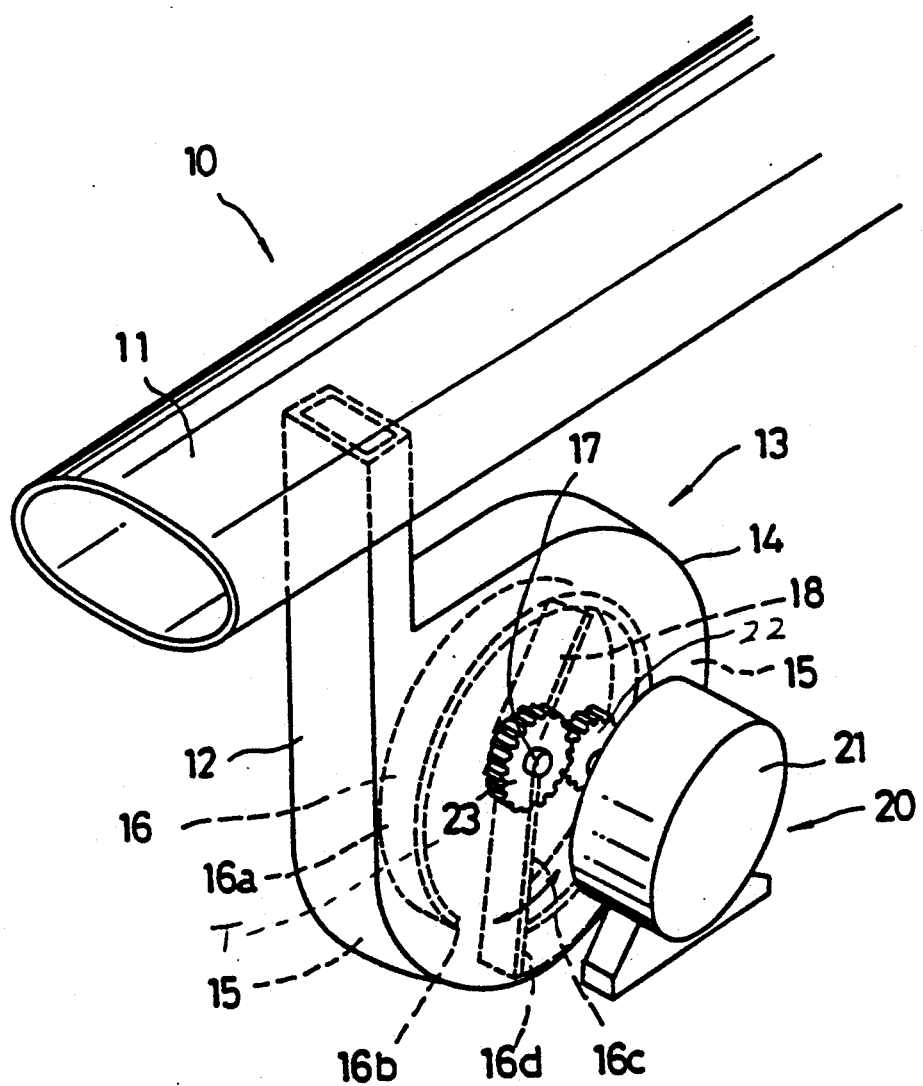
FIG. 2 is a perspective view of the silencer of FIG. 1.

In view of the above description of the conventional resonator type silencers, reference is now made to FIGS. 1 and 2, wherein an embodiment of the resonator type silencer of the present invention is illustrated by the reference numeral 10. The silencer 10 in this embodiment is for attenuating noise in an air intake duct 11 forming part of an intake system of an internal combustion engine of an automotive vehicle, the noise being mainly generated in the engine. The resonator type silencer 10 comprises a hollow neck section 12 which is branched off from the air intake duct 11 so that the inside of the duct 11 is in communication with the hollow neck section 12. The hollow neck section 12 is connected to a resonator section 13 which is formed into the annular and flat vessel shape and made of plastic. The resonator section 13 may be made of a material other than the plastic. In this embodiment, the neck section 12 and the resonance section 13 are formed integral with each other to constitute a one-piece structure. The resonance section 13 includes a flat cylindrical casing 14 whose inside is in communication with the neck section 12. Thus, the silencer 10 is of the so-called side-branched type wherein gas (air) cannot flow through it.

A generally cylindrical rotatable member 16 is rotatably disposed within the casing 14 and located coaxial with the casing 14. The cylindrical rotatable member 16 is rotatable around a rotatable or axial shaft 17 which is rotatably supported at the central portion of the casing 14. The outer peripheral surface of the cylindrical rotatable member 16 is separate from the inner peripheral surface of the casing 14 to form an annular space. A part of the annular space serves as an annular or peripheral passage 15 communicating with the neck section 12. The opposite ends of the cylindrical movable member 16 are respectively in slidable contact with the opposite inner side surfaces of the casing 14. A part of the cylindrical movable member 16 is cut out to form a communicating opening 16b through which the inside and outside of the cylindrical movable member 16 are communicated with each other.

A movable partition wall or plate 16c is fixed to the rotatable shaft 17 and extends radially outwardly to connect the cylindrical movable member 16 at an edge defining the communicating opening 16b. The movable partition wall 16c further extends radially outwardly over the edge of the cylindrical movable member 16 and reaches a position to be in slidable contact with the inner peripheral surface of the casing 14, thereby forming a blocking wall or plate 16d for blocking the annular space to define the peripheral passage 15. The walls 16c, 16d are aligned with each other. The opposite side edges of each of the walls 16c, 16d are respectively in slidable contact with the opposite inner side surfaces of the casing 14. As shown, a part of the neck section 12 extends to a position near the outer peripheral surface of the cylindrical movable member 16 to block the annular space 15.

Additionally, a stationary partition wall or plate 18 is fixed to the inner side surface of the casing 14 and extends radially outwardly from a position near the rotatable shaft 17 to a position near the inner peripheral surface of the cylindrical rotatable member 16. The opposite side edges of the stationary wall 18 are respectively in slidable contact with the opposite inner side surfaces of the casing 14. The stationary wall 18 defines, in cooperation with the movable partition wall 16c, a tuning chamber T inside the cylindrical movable member 16. The tuning chamber T is communicated through the communicating opening 16b with the peripheral passage 15 and accordingly with the neck section 12. Accordingly, when the cylindrical rotatable member 16 rotates, the communicating opening 16b and the movable partition wall and blocking wall 16c, 16d displace. As a result, the length of the peripheral passage 15 communicating with the neck section 12 changes while the volume of the tuning chamber T changes. It is to be noted that the total of the lengths of the neck section 12 and the peripheral passage 15 is referred to as the "length L of a neck" hereinafter.

As shown in FIG. 2, a gear 23 is fixedly mounted on the rotatable shaft 17 which is engaged with another gear 22. The gear 22 is fixedly mounted on a power output shaft (no numeral) of a motor 21 forming part of a driving section 20. The gears 22, 23 constitute a speed reduction mechanism for the motor 21. The motor 21 is preferably a servo-motor. The motor 21 is electrically connected through a control unit to an engine speed sensor, though not shown. Accordingly, when the engine speed sensor detects an engine speed R (r.p.m.) and outputs a signal representative of the engine speed, the signal is supplied to the control unit in which an operating signal is output in response to the signal. Then, the operating signal is supplied to the motor 21 of the driving section 20, so that the motor 21 is rotated in response to the operating signal.

The manner of operation of the resonator type silencer of this embodiment will be discussed hereafter.

During an engine operating condition in which the engine speed is relatively low, the frequencies of noise generated by the engine is relatively low while an intake air flow amount in the intake air duct 11 is relatively small. When the engine speed at this time is detected by the engine speed sensor, the engine speed sensor outputs the signal representative of the engine speed. The signal is transmitted to the control unit in which the engine speed signal is converted to a frequency signal corresponding to the engine speed signal. The frequency signal is transmitted as the operating signal to the motor 21 of the driving section 20. Then, the motor 21 rotates so as to cause the rotatable shaft 17 to rotate a predetermined rotational angle. Thus, the cylindrical rotatable member 16 rotates in accordance with the predetermined rotational angle. Then, the communicating opening 16c and the movable partition wall and blocking wall 16d displace, so that the length L of the neck changes while changing the volume of the tuning chamber T defined inside the cylindrical rotatable member 16 by the stationary and movable partition walls 18, 16c.

Here, the interrelation between resonant frequency f and engine speed R is represented by the following equations, in which the resonant frequency f is a frequency at which resonance is made corresponding to the frequency of noise which is within the air intake duct 11 and generated by the engine, i.e., a natural frequency depending on the total of the volume of the neck having the length L and the volume V of the tuning chamber T:

$$R(\text{rpm}) = \frac{C}{2\pi} \sqrt{\frac{\pi r^2}{V(L + 1.64r)}} \times \frac{120n}{N}$$

The resonant frequency f can be replaced with fr in the case of the above-mentioned conventional silencer of the Helmholtz resonator type.

$$f = fr = \frac{C}{2\pi} \sqrt{\frac{S}{Vl}}$$
$$= \frac{C}{2\pi} \sqrt{\frac{\pi r^2}{V(L + 1.64r)}}$$

where r is the inner radius of the neck (12, 15); N is the number of engine cylinders of the engine; n is an integer corresponding to a design condition; V is the volume of the tuning chamber T; and C is sonic velocity.

As apparent from the above, as the engine speed becomes higher, the angle of rotation of the cylindrical rotatable member 16 increases in a counterclockwise direction so that the communicating opening 16c separates from the neck section 12 thereby increasing the length of the peripheral passage 15 and accordingly, the length L of the neck. Simultaneously, the volume V of the tuning chamber T defined by the stationary and movable partition walls 18, 16c inside the cylindrical rotatable member 16 increases.

Hence, during another engine operating condition in which the engine speed is relatively higher, the length L of the neck and the volume V of the tuning chamber T are increased as compared with those during the relatively low engine speed engine operating condition, thereby effectively attenuating noise in the intake system under the resonance effect of the resonator type silencer.

While the principle of the present invention has been shown and described as being applied to the resonance type silencer in the intake system, it will be understood that it may be also applied to a resonance type silencer in an exhaust system, in which the silenser is connected to an exhaust tube through which exhaust gas from the engine flows.

As is appreciated from the above discussion, according to the embodiment of the resonator type silencer of the present invention, the cylindrical rotatable member of the resonator section is driven to rotate in accordance with the frequency of noise within the air intake duct in the intake system or within the exhaust pipe in the exhaust system, the frequency varying corresponding to engine speed. Accordingly, the length of the neck and the volume of the tuning chamber of the resonator type silencer can be controlled, thereby giving rise to resonance in the resonator section, corresponding to the frequency of the noise generated at that time in the engine (particularly, the automotive engine) whose engine speed varies throughout a wide range. The changing of the length of the neck and the volume of the tuning chamber is accomplished by moving a control mechanism rotationally around the axial shaft but not linearly, and therefore a large space for the maximum length of the neck and the maximum volume of the tuning chamber is not required. This eliminates the need for a large space in layout of the intake or exhaust system of the vehicle, while rendering the silencer compact.

What is claimed is:

1. A Helmholz and side branch resonator type silencer for an internal combustion engine, comprising:
   a hollow neck section in communication with a duct in which gas in connection with combustion in the engine flows;
   a housing including a generally annular casing disposed between a pair of sidewalls, said housing fixedly connected to said neck section;
   a generally cylindrical rotatable member disposed within and located generally coaxial with said casing to form an annular space between it and an inner peripheral surface of said casing, said cylindrical rotatable member being rotatable around an axial shaft disposed at a central portion of said housing;
   a stationary partition wall disposed in said housing and inside said cylindrical rotatable member, said stationary partition wall being fixed to said sidewalls, and extending radially;
   a movable partition wall disposed in said housing and extending from said axial shaft to said cylindrical movable member, said movable partition wall being movable with said cylindrical movable member and defining, in cooperation with said stationary partition wall, a tuning chamber inside said cylindrical movable member;
   a movable blocking wall disposed in said housing to block said annular space so as to define a peripheral passage in communication with said neck section, said movable blocking wall extending from said cylindrical movable member to the inner peripheral surface of said casing and movable with said cylindrical movable member;
   means defining a communicating opening in said cylindrical rotatable member so that said tuning chamber is communicated through said communicating opening with said peripheral passage; and
   means for rotating said cylindrical rotatable member in accordance with an engine operating condition so as to change a length of said peripheral passage communicating with said neck section and a volume of tuning chamber, and
   wherein said housing substantially prevents flow of gas from exiting said tuning chamber.

2. A resonator type silencer as claimed in claim 2, wherein said axial shaft is rotatably supported by said casing.

3. A resonator type silencer as claimed in claim 1, wherein said stationary partition wall extends from first position near said axial shaft to a second position near the inner peripheral surface of said cylindrical rotatable member.

4. A resonance type silencer as claimed in claim 1, wherein said communicating opening is a cutout defined between opposite edges of said cylindrical movable member.

5. A resonator type silencer as claimed in claim 4, wherein said movable partition wall has a first end fixed to said axial shaft and a second end connected to one of said edges of the cylindrical movable member.

6. A resonator type silencer as claimed in claim 5, wherein said movable blocking wall has a first end connected to the edge of said cylindrical movable member and a second end located to a position near the inner peripheral surface of said casing, said movable blocking wall being aligned and connected with said movable partition wall.

7. A resonance type silencer as claimed in claim 2, wherein said rotating means includes a motor driveably connected to said axial shaft to rotate said axial shaft a predetermined rotational angle in response to the engine operating condition.

8. A resonance type silencer as claimed in claim 7, wherein said engine operating condition is engine speed of the engine.

9. A resonance type silencer as claimed in claim 1, wherein said neck section extends to a position near the outer peripheral surface of said cylindrical movable member to block said annular space.

* * * * *